July 17, 1956 D. B. ROSSHEIM ET AL 2,755,199
HARD COATED COMPOSITE AND METHOD OF FORMING
Filed Feb. 19, 1951 2 Sheets-Sheet 1

INVENTORS.
DAVID B. ROSSHEIM
ULRICH JELINEK
BY
Virgil F. Davies
ATTORNEY

United States Patent Office 2,755,199
Patented July 17, 1956

2,755,199

HARD COATED COMPOSITE AND METHOD OF FORMING

David B. Rossheim, Teaneck, and Ulrich Jelinek, Springfield, N. J., assignors to The M. W. Kellogg Company, Jersey City, N. J., a corporation of Delaware Application February 19, 1951, Serial No. 211,706

2 Claims. (Cl. 117—17)

This invention relates to composite materials suitable for extreme service conditions.

Materials are available whose melting points are much higher than those of the metals and special alloys now used as construction materials for apparatus and tools. Many of these high melting point materials at and greatly above the temperatures whereat the metals and special alloys mentioned are either molten or of such little strength as to be useless, exhibit strength, hardness and other desirable properties and characteristics that indicate their use as construction materials for the apparatus and tools necessary in operations which involve extreme temperatures.

The high melting point materials which exhibit high temperature hardness and strength in the greatest degree and which have sufficient resistance to oxidation and similar corrosion effects to give them a life of reasonable length under extreme service conditions have several disadvantages. They are generally quite costly and in limited supply. Also, they are not available in conventional forms and shapes as they are produced from their respective source materials in the subdivided form only and because of their high melting points and other properties cannot be cast and formed in conventional ways.

By use of highly specialized procedures some of these high melting points, high temperature hardness and strength materials have been converted from their original subdivided form into dense substantially unitary masses which approach cast metal in character. Such masses have only limited use as they are generally quite small, have little shock resistance and have insufficient ductility. It has been proposed to form such masses into composites by uniting them to a suitable cast or wrought base of a chosen metal or special alloy. The characteristics of such masses render the attainment of composites by welding well nigh impossible, consequently, such masses are usually brazed or similarly united to the base metal. By reason of the comparatively weak, low melting point these composites are not suitable for extreme service conditions.

It is the more common practice to form the subdivided high melting point, high temperature hardness and strength materials into cemented masses. In this form, the particles of the high melting point, high temperature hardness and strength materials are mechanically contained in a matrix of a much softer material with a much lower melting point; the matrix material is usually nickel or cobalt. While these cemented products are of great utility, full benefit of the properties of the high melting point materials contained in them cannot be had due to the diluting effect of the softer and lower melting point matrix and brazing materials.

It has been found, in accordance with this invention, that composites may be produced from said subdivided high melting point, high temperature hardness and strength materials in which a layer of said materials is integrally united to the base metal by a weld bond and the original particles of the layer material are interfused into a unitary mass at least comparable to cast metal. It has also been found that said layer of high melting point, high temperature hardness and strength material may be produced as a unitary, dense, substantially homogeneous mass comparable to conventional cast or wrought metal or it may be produced as a unitary spongelike mass of controlled porosity. It has furthermore been found that non-weldable high melting point, high temperature hardness and strength materials but of low heat and electrical conductivity may be incorporated in subdivided form in the layer of conductive high melting point material of the composite as an integral part of said layer. In addition, it has been found that after formation of the composite, the layer of high melting point material may in certain cases have a depth thereof, or all thereof, changed in chemical composition to provide further desirable properties.

A primary object of this invention is to provide a composite material, as well as a method for producing the composite material, which is made up of a metal base, chosen from the metals and alloys normally used as materials of construction, to which is integrally united by a fusion bond a depth of high melting point, high temperature strength and hardness material, said depth of material being characterized by its unitary character.

A further primary object of this invention is to provide a composite material, as well as a method for producing the composite material, which is made up of a metal base, chosen from the metals and alloys normally used as materials of construction, to which is integrally united by a fusion bond a depth of high melting point, high temperature strength and hardness material of the character referred to, the increments of said layer coalescing with each other to provide a unitary structure, said layer having a controlled porosity.

A still further primary object of this invention is to provide a composite material, as well as a method for producing the composite material, which is made up of a metal base, chosen from the metals and alloys normally used as materials of construction, to which is integrally united by a fusion bond a depth of high melting point, high temperature hardness and strength material of the character referred to, said depth being made up of an interfused high melting point matrix of a metal or a metal-like material in which there is interspersed a non-metallic refractory material of comparable or higher melting point.

A still further important object of this invention is to provide a composite material, as well as a method for producing the composite material, which is made up of a metal base, chosen from the metals and alloys normally used as materials of construction, to which is integrally united by a fusion bond a depth of high melting point, high temperature hardness and strength material of the character above referred to, the increments of said layer being interfused to provide a unitary structure and at least the outer portions of said layer being composed of highly refractory non-metallic material of lower heat and electrical conductivity than the remainder of said layer.

An additional important object of this invention is to provide a method for producing composite material in which high melting point material of the character referred to, is placed in the particle form on a base metal, chosen from the metals and alloys normally used as materials of construction, pressure is applied thereto and while said pressure is maintained electric current is discharged through said subdivided material to at least fuse the external portions of the particles thereof whereby said particles are interfused with each other and the bottom layer or layers thereof are also interfused with the base metal, the pressure applied being sufficient to compact the high melting point material into a dense unitary mass.

The more specific objects of the invention, the advantages and the novel features thereof will be apparent from a consideration of the following detailed disclosure taken with the accompanying drawings, in which.

Figure 2:
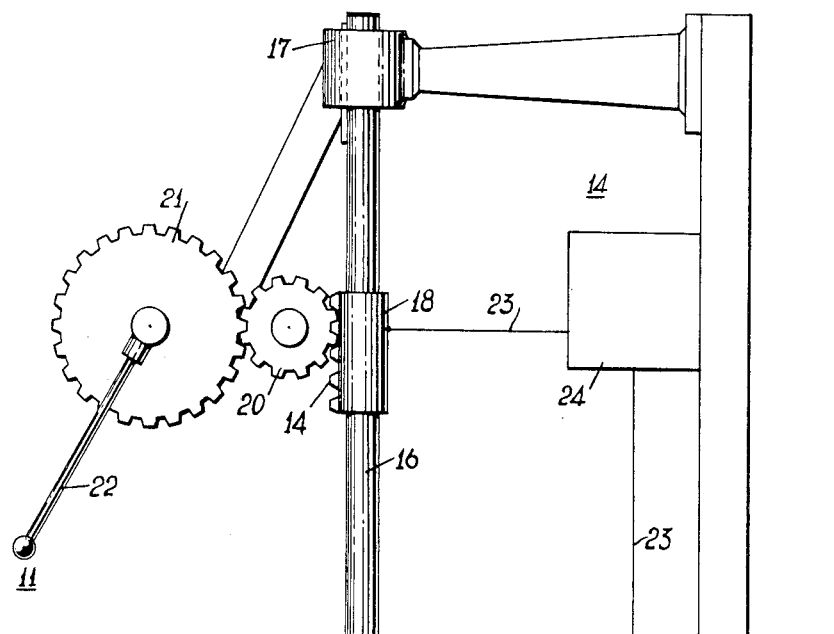
Fig. 2 is a schematic view of an apparatus suitable for making the novel composite material of the invention.
Figure 1:
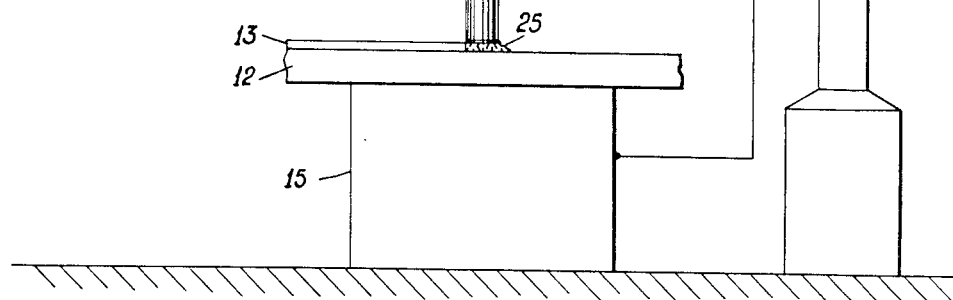
Fig. 1 is a cylindrical section of a vessel made of the composite material of the invention.
Figure 1:
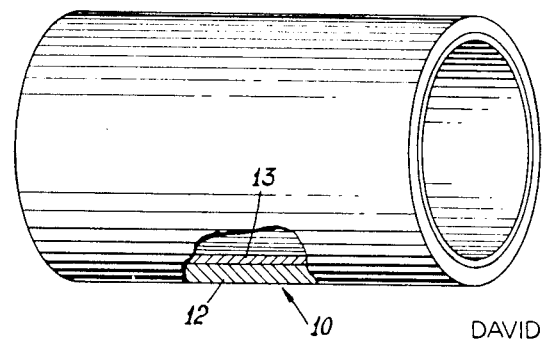

The composite material of the invention may be in the form of a flat member of rectangular or other shape suitable for use as a tool or as an element of a machine; also, the novel composite material may be in the form of an open, or closed, ended vessel of cylindrical or other shape forming an element of apparatus in which material is handled or processed. For the purposes of this disclosure the novel composite material 10 is shown as formed into the open ended cylindrical section 11 of a vessel.

The novel composite material 10 comprises a thickness of base metal 12 whose inner surface is protected by the layer 13 of high melting point, high temperature hardness and strength material. The layer 13 is shown as defining the inner surface of the section 11 but it is to be understood that the layer 13 may define the outside surface of said section or both the outside and the inside surface of said section; also, the layer 13 may be coextensive with and define the whole or any portion of said surfaces. The layer 13 is integrally united to the base metal 12 by a fusion bond. Thus, while the layer 13 protects the layer 12, layer 12 supports the layer 13 and thus the layer 13 is capable of developing greater strength and greater resistance to both thermal and mechanical shock.

The material of the layer 13 is characterized by its great hardness, strength, wear resistance and corrosion resistance at temperatures, 2000° F. and more, materially above the temperatures at which the metals and alloys, including the high temperature alloys, now used as construction materials for tools and apparatus are either plastic or have such little strength and hardness as to be useless. The material of layer 13 has a melting point of at least 3000° F.; it is metallic, or metal-like, in character and it has electrical and heat conductivities of the order of those of the metals. The base metal 12 may be of any of the common metals and alloys, or special alloys, having the strength and other characteristics required by the service in which the composite 10 is to be used.

Protective layer 13 having the properties and characteristics above set forth, may comprise one or more of the refractory metals, the refractory metal carbides, the refractory metal nitrides, and the refractory metal borides having a melting point of 3000° F. and more.

(a) The refractory metals found best suited as materials for the layer 13 comprise rhenium, osmium, ruthenium, iridium, columbium, hafnium, chromium, zirconium, thorium and boron.

(b) The refractory metal carbides found best suited as materials for the layer 13 comprise tantalum carbide, hafnium carbide, zirconium carbide, columbium carbide, titanium carbide, tungsten carbide (WC and $W_2C$), vanadium carbide, molybdenum carbide (MoC and $Mo_2C$), boron carbide ($B_4C$ and $B_6C$) and chromium carbide.

(c) The refractory metal nitrides found best suited as materials for the layer 13 comprise tantalum nitride, boron nitride, hafnium nitride, zirconium nitride, titanium nitride, vanadium nitride and columbium nitride.

(d) The refractory metal borides found best suited as materials for the layer 13 comprise hafnium boride, zirconium boride, titanium boride, tungsten boride, tantalum boride and molybdenum boride.

The materials set forth in (a), (b), (c) and (d), above, besides having melting points in excess of 3000° F. are all characterized by their low ductility; because of these and other properties and characteristics they cannot be fused and formed into foils, sheets, shaped bodies, etc. These materials, furthermore, are all produced from their respective raw materials in the subdivided form and are available only in the subdivided form.

The protective layer 13 may be made up entirely of any one of the materials set forth in (a), (b), (c) and (d), above, or any combination of said materials. The materials set forth in a), (b), (c) and (d), above, while they all have the required properties and characteristics, have said properties and characteristics in varying degree. Hence, in any particular case the material chosen for the protective layer 13 will be determined by the conditions to which the composite 10 is to be subjected in use.

No only may be protective layer 13 be composed entirely of one or more of the materials set forth in (a), (b), (c) and (d), above, but it may be composed of one or more of said set forth materials in which there is interspersed various proportions of one or more non-metallic refractory materials of the same order of melting point but of greatly reduced heat and electrical conductivity. The heat and/or electrical conductivity of the layer 13 may thus be controlled within rather wide limits by varying the ratio of the non-conductive component or components.

The non-conductive materials suitable for dispersal in layer 13 are chosen from the high melting point silicides and oxides. The most suitable silicides comprise titanium silicide, zirconium silicide, carbon silicide (silicon carbide), molybdenum silicide and tungsten silicide. The most suitable oxides comprise zirconium oxide, aluminum oxide, chromic oxide and silicon dioxide. These most suitable silicides and oxides are all non-conductive at room temperatures, have low conductivity at even highly elevated temperatures and have excellent hot hardness.

The protective layer 13 of any chosen composition may be a unitary, dense, solid mass comparable to cast or wrought metal or it may be a unitary, porous mass of predetermined porosity. By varying the porosity the electrical and heat conductivity of the protective layer 13 may be varied within rather wide limits.

The protective layer 13 may furthermore have the external surface defining portion thereof in the form of an oxide or oxides. The thickness of the oxide portion may be as little as a fraction of a thousandth of an inch or may be as much as substantially the full thickness of the protective layer 13. The oxide thickness will be made up of the oxide, or oxides, of the metal, or metals, of the material, or materials, chosen from the materials set forth in (a), (b), (c) and (d) which comprise or are included in layer 13.

The protective layer 13 may range in thickness from 0.005 to 0.25 inch, or more, depending on the service conditions it is intended to withstand.

The base metal 10 may be of any preferred composition having the properties required by the service conditions. The metals and alloys such as carbon steel, low alloy steels, chrome steels, chrome-nickel steels, high temperature alloys, and the like, available as materials of construction for apparatus and tools are suitable. Such metals and alloys, while they have excellent strength and hardness characteristics at ordinary temperatures, are of low strength and hardness at temperatures in the order of 1000° F. The base metal 12 may be of any thickness required by the service. Since the layer 13 cannot be shaped other than by grinding and polishing operations, the base 12 will be put in its ultimate form and shape before the layer 13 is applied thereto.

The apparatus 14, schematically shown in Fig. 2, may conveniently be employed in making the composite 10. This apparatus includes an anvil 15 upon which the base metal 12 is adapted to be placed and an electrode member 16 mounted for longitudinal movement relative to the anvil 16 in a bearing support 17. The electrode member 16 is preferably a conventional indestructible electrode and may be water-cooled. A collar 18 is fixed to the electrode member 16 intermediate the ends thereof and includes a ratchet 19 which meshes with the ratchet wheel 20. The wheel 20 engages a second wheel 21 which is rotated through the handle 22 to move the electrode member 16 longitudinally and to apply pressure thereon. The collar 17 and the anvil 15 are connected through the cables 23 to the current source and controls housed in the casing 24. Since such current source and controls are conventional they will not be particularly described here.

The current source and controls are preferably such as are provided for electric resistance welding, i. e., resistance welding at low voltage, high amperage. However, spot welding (condenser-discharge electric resistance welding) current source and controls may alternatively be employed.

The material for the protective layer 13, chosen from the groups (a), (b), (c) and (d), above, is provided in comparatively fine powder form and a quantity 25 thereof is placed on the base metal 12 and beneath the electrode 16. The handle 22 is then manipulated to move the end of the electrode 16 into contact with said quantity 25 to apply sufficient pressure to compact said quantity 25; generally pressures in the order of 850–900 p. s. i. are sufficient. The pressure is maintained and the welding circuit closed to pass current through said quantity 25 to interfuse the component particles thereof into a unitary mass and to unite said mass to the base metal 12 by a fusion bond. The current flow is controlled as to amperage and voltage and time of duration of flow so that the component particles of said quantity 25 are heated to such a degree that only the very fine particles are fused completely while the remaining larger particles have only their outer portions fused. The fused material provides a matrix that envelops said remaining larger particles and unites them into a unitary mass, said matrix material furthermore coalesces into the base metal 12 and integrally unites said mass thereto. During the current flow the strength of said quantity 25 under the electrode 16 does not appreciably change and the pressure remains substantially constant from start to finish of the fusing operation. At the completion of the current flow the electrode 16 is raised. The fusing operation is repeated on different areas of the base metal 12 until a layer 13 of the required extent is formed. If layer 13 is to be of a greater thickness that can be conveniently obtained in a single coverage of the surface of the base metal 12, the operation is repeated upon the already covered surface as many times as is necessary to obtain the required thickness.

It has been found in practice that the best results are obtained when the thickness of the mass united to the base metal 12 in one fusion operation ranges in thickness from 0.020 inch to 0.030 inch. The best results are obtained when the material of said quantity 25 is largely made up of particles of 500 mesh with enough of finer particles present to fill up the interstices between the larger particles. When said interstices are substantially filled the resultant layer 13 will be dense and comparable to cast metal. By employing less than the amount of fines required to fill said interstices a porous layer 13 will be produced. The porosity may be varied by varying the amount of fines employed.

It has also been found that the results set forth above are best obtained when the fusing current is supplied at from 0.5 volt to 2.0 volts and ranging from 90 to 110 amperes at 60 cycles per second; such current flow produces the best results in from 10 to 20 cycles.

When the refractory non-conducting materials set forth above are to be incorporated in the protective layer 13, the refractory non-conducting materials are also provided in subdivided form. The grit size of the non-conducting material employed will vary depending on the service in which the composite is to be used. When the non-conducting material is employed because of its insulating properties comparatively large particle sizes are employed, for instance, 16 grit size has been found suitable. The non-conducting material is intermixed, as for instance by tumbling, to assure the complete coverage of the surfaces of the non-conductive particle with the fines of the conducting material. After the tumbling the mixture may be screened to remove any excessive fines. The mixed material is then ready for the fusion operation which is carried on as set forth above.

Figure 4:
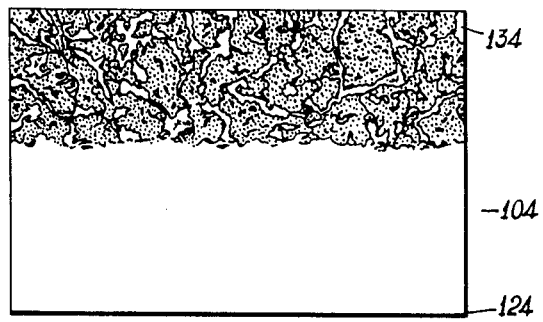
Fig. 4 is a photomicrograph of an unetched section of the novel composite material at 500×magnification showing the protective layer thereof formed of titanium carbide and aluminum oxide.

Fig. 4 shows a protective layer 13 formed by intermixing $Al_2O_3$ particles with TiC particles. In forming this composite 500 grit size TiC and 16 grit size $Al_2O_3$ were employed in equal proportions.

The protective layer 13 when formed of the materials of groups (a), (b), (c) and (d) may have the surface defining portions thereof converted into non-conductive materials by subjecting said surface defining portions to oxidation. In the case of the materials of groups (a), (b) and (c) the oxidation will convert said surface portions in an oxide or oxides while in the case of the materials of group (d) the oxidation will convert said surface portions into a mixture of oxides and borates. In any case the oxidation products are of extremely high melting point and of low heat and electrical conductivity. The depth on oxidation products produced will be determined by the temperature of the reaction and the time the reaction is permitted to go on. The oxidation may be conveniently carried out by means of a high temperature oxidizing flame as for instance an oxy-acetylene flame. For example, a composite having a protective layer 13 formed of zirconium boride had the surface portions of said layer 13 oxidized by playing thereon an oxy-acetylene flame, oxidation began when the temperature of said layer 13 reached about 1900° F. A thin layer of oxidation products was obtained in a few minutes. The layer was tested electrically and at room temperature electric current at 115 volts could not be passed through it.

Figure 3:
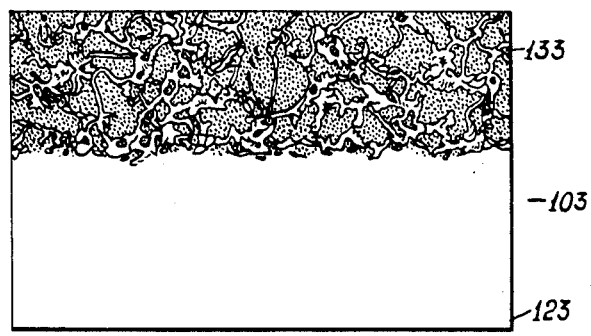
Fig. 3 is a photomicrograph of an unetched section of the novel composite material at 100×magnification showing the protective layer thereof formed of titanium carbide.
Figure 5:
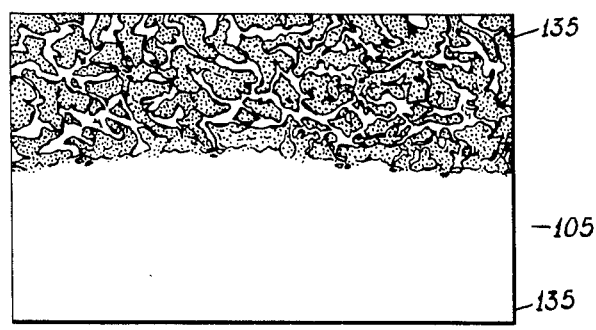
Fig. 5 is a photomicrograph of an unetched section of the novel composite material at 100×magnification showing the protective layer thereof formed of zirconium boride.

The photomicrographs of Figs. 3, 4 and 5 show the novel composite material, designated as 102 in Fig. 3; 104 in Fig. 4 and 105 in Fig. 5 with different protective layers, designated as 133 in Fig. 3, 134 in Fig. 4 and 135 in Fig. 5. The layer 133 is composed of titanium carbide, the layer 134 is composed of titanium carbide and alumina and the layer 135 is composed of zirconium boride. The base metal, designated as 123 in Fig. 3, 124 in Fig. 4 and 125 in Fig. 5 is stainless steel having S. A. E. designation 347. The specimens were ground and polished before photographing but they were not etched.

All of these photomicrographs show their respective protective layers 133, 134 and 135 as made up of a plurality of distinct irregularly shaped grains or particles in close proximity one to the other and arranged in a heterogeneous fashion with a matrix surrounding each particle and united thereto. The matrix unites the particles into a unitary mass. The matrix also coalesces into the respective base metals 123, 124 and 125 to integrally bond the respective protective layers 133, 134 and 135 to said respective base metal. The particles and the matrix are distinguishable in the photomicrograph because the matrix has been fused while the particles have not.

It is to be noted that in Fig. 4 the larger particles are the Al$_2$O$_3$ particles while the smaller particles are the titanium carbide particles. It is to be noted that the alumina particles are completely encompassed by the titanium carbide matrix and are united thereto to form a unitary mass. It is also to be noted that some voids are present, the voids appear as black areas, some voids are within the alumina particles while the remainder are produced by lack of matrix between the titanium carbide and/or the alumina particles. The latter voids are rather uniformly distributed throughout the layer 134 and represent some 5% of said layer 134.

What is claimed is:

1. The method of forming a composite body having a base of ferrous metal of good strength and hardness at ordinary temperatures but of poor strength and hardness at temperatures in the order of 1000° F. and a protective layer integrally united thereto, said protective layer melting at a temperature in excess of 3000° F. and exhibiting high hardness and strength at temperatures in excess of 2000° F., which comprises depositing in subdivided form and on the surface of said base a quantity of electrically conductive material having a melting point of at least 3000° F. and exhibiting good hardness and strength at temperatures in excess of 2000° F., said sub-divided, electrically conductive material chosen from the group consisting of the metals, the metal carbides, the metal nitrides and the metal borides having melting points in excess of 3000° F., the particles of said quantity being so graded in size that sufficient fine particles are present to fill at least the major portion of the spaces between the larger particles, applying pressure in the order of 850–900 p. s. i. to said quantity to compact it into a dense mass, discharging electric current through said quantity at from ½ to 2 volts and at from 90 to 110 amperes for a period ranging from ¼ to ⅓ seconds while said pressure is applied to fuse the bulk of said fine particles and surface portions of said larger particles to provide a matrix that encompasses said larger particles and coalesces into said base.

2. The method of forming a composite body as set forth in claim 1 in which said quantity of subdivided electrically conductive material is such as to produce a protective layer ranging in thickness from 0.02 to 0.03 inch.

References Cited in the file of this patent

UNITED STATES PATENTS

| | | |
|---|---|---|
| 1,342,801 | Gebauer | June 8, 1920 |
| 1,756,857 | Gilson | Apr. 29, 1930 |
| 1,826,457 | Comstock | Oct. 6, 1931 |
| 1,918,064 | Taylor | July 11, 1933 |
| 1,960,879 | Russell | May 29, 1934 |
| 1,977,128 | Hawkins | Oct. 16, 1934 |
| 1,981,719 | Comstock | Nov. 20, 1934 |
| 1,993,598 | Hubert | Mar. 5, 1935 |
| 2,077,239 | Hinnuber | Apr. 13, 1937 |
| 2,124,509 | McKenna | July 19, 1938 |
| 2,178,527 | Wellman | Oct. 31, 1939 |
| 2,313,227 | DeBats | Mar. 9, 1943 |
| 2,337,588 | Calkins | Dec. 28, 1943 |
| 2,339,392 | Garner | Jan. 18, 1944 |
| 2,355,954 | Cremer | Aug. 15, 1944 |
| 2,389,061 | Kuzmick | Nov. 13, 1945 |
| 2,398,132 | Cottrell | Apr. 9, 1946 |
| 2,410,512 | Lindquist | Nov. 5, 1946 |
| 2,464,591 | Larsen | Mar. 15, 1949 |
| 2,488,731 | Lambert | Nov. 2, 1949 |
| 2,491,284 | Sears | Dec. 13, 1949 |
| 2,508,466 | Brace | May 23, 1950 |
| 2,575,808 | Halverson | Nov. 20, 1951 |
| 2,592,414 | Gibson | Apr. 8, 1952 |
| 2,617,064 | Lewin | Nov. 4, 1952 |